United States Patent [19]

Sanders

[11] Patent Number: 5,518,277
[45] Date of Patent: May 21, 1996

[54] SINGLE PIECE DUCT CONNECTOR FOR LEAKFREE ATTACHMENT TO SIDEWALL OF HIGHLY FLEXIBLE TRUNKLINE DUCT

[75] Inventor: Gregory C. Sanders, Ocala, Fla.

[73] Assignee: GCS Innovations, Inc., Lake Mary, Fla.

[21] Appl. No.: 230,596

[22] Filed: Apr. 21, 1994

Related U.S. Application Data

[63] Continuation-in-part of Ser. No. 962,241, Oct. 16, 1992, Pat. No. 5,314,212, which is a continuation-in-part of Ser. No. 754,061, Sep. 3, 1991, abandoned.

[51] Int. Cl.$^6$ ............................................. F16L 41/08
[52] U.S. Cl. ........................ 285/197; 285/424; 285/204; 285/222; 285/189; 29/513; 29/890.148
[58] Field of Search ................................ 285/197, 150, 285/189, 424, 204, 222, 158; 29/513, 890.148

[56] References Cited

U.S. PATENT DOCUMENTS

| | | | |
|---|---|---|---|
| 193,847 | 8/1877 | Choate | 285/183 |
| 2,886,007 | 7/1937 | Tompkins | 285/183 |
| 2,963,783 | 12/1960 | Field | 285/424 |
| 3,185,506 | 5/1965 | Szlashta | 285/183 |
| 3,290,066 | 12/1966 | Primich | 285/183 |
| 4,147,382 | 4/1979 | Wachter | 285/189 |
| 5,314,212 | 5/1994 | Sanders | 285/197 |
| 5,393,106 | 2/1995 | Schroeder | 285/158 |

Primary Examiner—Eric K. Nicholson
Attorney, Agent, or Firm—Julian C. Renfro

[57] ABSTRACT

A single piece duct fitting of generally cylindrical configuration for attachment to a large cylindrically-shaped flexible duct having a curved, easily deformed sidewall in which a hole has been created. This novel duct fitting is constructed of deformable sheet material that, before being assembled into a cylindrical configuration, was defined by an elongate sheet of material having a long edge of a generally sinusoidal configuration, with a plurality of short lateral slots defining teeth in this long edge. A pair of relatively closely spaced curves of generally sinusoidal configuration are disposed adjacent the teeth, which curves bear a closely aligned relationship with the first long edge of generally sinusoidal configuration. A plurality of evenly spaced slits extend between the pair of sinusoidal curves, with these slits defining a plurality of substantially identical tab members intended to bend outwardly when lengthwise compression is applied to the duct fitting. The tabs, upon being bent flat by the application of lengthwise compression to the duct fitting, forming an integral flange member of sinusoidal configuration extending around the duct fitting. After the teeth disposed along the first long edge have been inserted into a hole in the curved sidewall of the flexible duct and then bent over into a position preventing withdrawal of the duct fitting, the integral flange member serves as insertion-limiting means when brought into contact with the exterior of the duct fitting, for limiting the insertion of the duct fitting into the hole in the flexible ducting.

11 Claims, 2 Drawing Sheets

SINGLE PIECE DUCT CONNECTOR FOR LEAKFREE ATTACHMENT TO SIDEWALL OF HIGHLY FLEXIBLE TRUNKLINE DUCT

RELATIONSHIP TO PREVIOUS INVENTION

This is a Continuation-in-Part of my allowed patent application "DUCT CONNECTOR FOR LEAKFREE ATTACHMENT TO THE CURVED SIDEWALL OF HIGHLY FLEXIBLE TRUNKLINE DUCT," Ser. No 07/962,241, filed Oct. 16, 1992, now U.S. Pat. No. 5,314,212 issued May 24, 1994, which was in turn a Continuation-in-Part of my now-abandoned patent application entitled "AIR CONDITIONING/HEATING DUCT TAP-IN CONNECTOR AND METHODS," Ser. No. 07/754,061, which had been filed Sep. 3, 1991.

BACKGROUND OF THE INVENTION

1. Field of the Invention

This invention relates generally to ducting as used in air conditioning and heating systems, and more particularly to a single piece duct fitting specifically contoured to be used with highly flexible ducting in a multi user system.

2. Description of the Prior Art

It is customary in the heating, cooling and ventilating field to use a main or trunk duct, having extending from it one or more branch ducts. Various fittings have been proposed for connecting a branch duct to an associated main duct. One manner of attaching a fitting to a duct is shown in U.S. Pat. No. 3,290,066 to Primich et al entitled "Sheet Metal Pipe Fitting," which issued Dec. 6, 1966. In that device, a plurality of tabs formed so as to extend axially from the fitting are to be bent over in order to secure the fitting on an associated duct. A significant problem, however, exists with regard to time, tools and the relatively high degree of skill required to accurately cut a properly sized hole in the trunk duct. Such a trunk duct may of course be constructed from rigid or from flexible material, such as reinforced fiberglass and the like. As will be seen hereinafter, the single piece duct fitting forming the subject matter of this invention is primarily configured for use with highly flexible ducting, although it may also be utilized with certain diameter rigid ducting.

U.S. Pat. No. 3,349,792 issued to Larkin on Oct. 31, 1967, and U.S. Pat. No. 3,609,056 issued to Hougen on Sep. 28, 1971, disclose examples of hole cutting tools which can be used for cutting holes in prior art air conditioning ducting. A basic disadvantage of such approach, however, is that a large number of cutting tools of various sizes must be kept available in order to cut a hole which is sized properly for a specific duct fitting. Further, there can be difficulty in inserting a fitting into a hole cut for it, if the pre-cut hole is irregular, or too small. If the hole is too large, the fitting will be loose and most likely it will be a source of undesirable air leakage.

Another problem encountered with the installation of branch duct fittings to main ducts of air conditioning systems, and the like, is that there must be found a manner of attaching the fitting to the duct. Other than the use of the aforementioned bent tabs, it is a common practice to employ bolts and similar fasteners which result in projection of the ends of the fasteners into the main duct. Such projections are generally quite undesirable, inasmuch as they cause turbulence in the air stream within the duct.

Accordingly, it is well known in the art to provide quick connection arrangements on duct fittings in order to eliminate the attachment problems referred to above, as well as to insure a good fit between the fitting and an associated duct. Examples of such quick connections can be found in U.S. Pat. No. 3,477,745 issued Nov. 11, 1969 to J. W. Williams et al and U.S. Pat. No. 3,915,477 issued Oct. 28, 1975 to D. R. Timmons. These fittings are intended specifically for use with reinforced fiberglass ducts and employ helical rings formed about the periphery of the connection end of the fitting, which permit the connection end of the fitting to be threaded through a pre-cut hole. Once threaded through the duct, the split ring or flange retains the fitting in place on the duct.

With the latter approach, however, not only is it first necessary to pre-cut a hole in the associated duct, the problems of which are discussed above, but also, during insertion of the fitting into the hole, the helical rings tend to tear or shred the wall in the area circumscribing the hole. This also is the case with U.S. Pat. No. 3,726,545 entitled "Air Duct Connector," which issued Apr. 10, 1973 to J. R. Grim et al. This latter patent discloses an air duct connector especially for use with reinforced fiberglass ducts in which the leading edge of the connector is provided with widely spaced cutting teeth for initially forming a circular aperture in the duct wall. Widely spaced radially extending tabs are provided proximate the cutting teeth for being threaded into the hole during cutting thereof to lock the fitting in the hole in the fiberglass duct or plenum chamber wall.

Besides tearing, or shredding the wall, a disadvantage of the construction suggested by Grim is that the cutting teeth, which are not intended to be bent over, will extend into the fluid flow path of the trunk duct so as to cause turbulence therein. Further, it is highly desirable to remove the cutout portion, or slug, of the duct wall from the interior of the duct, for such cutout portion could cause turbulence, air flow restriction, noise, and the like if left in the duct. In an instance in accordance with the Grim teaching, the workman concerned with the removal of the cutout portion must work very carefully through the mounting fitting in order to avoid being injured by the projecting cutting teeth.

Poorly fashioned cuts, such as result from the pre-cutting of holes by the freehand use of a knife, razor blade, and the like, as required in some of the hereinbefore described prior art fittings, usually results in loose fits and highly undesirable air leakage. Over a period of months, this can amount to a serious amount of wastage. Also, sidewall tearing or shredding resulting from the use of other above discussed prior art fittings can result in leakage-prone weak spots in the areas where the fittings are mounted to the trunk duct. Furthermore, it is most important to keep shredded fibers out of the air moving in the duct system, to prevent the known health hazard associated with airborne fibers.

Regardless of the technique used to mount a branch line fitting in a main or trunk duct, a problem has long existed with regard to diverting air out of the airflow stream in the trunk duct into the branch duct. In many prior art systems, this air diversion problem is simply ignored, with the result being that the pressure of the air in the trunk duct will be totally relied upon to cause a suitable amount of air to move into the branch duct. In many instances, the failure to accomplish a dynamic redirecting of the air flowing in the trunk duct results in inadequate air flow in the branch lines.

The Goettel U.S. Pat. No. 4,491,124 entitled "Self-Tapping Duct Fitting," which issued Jan. 1, 1985, attempted to solve the air diversion problem by pivotally mounting a flat plate damper in the duct fitting and providing a suitable linkage so that subsequent to fitting installation, the damper could be moved to a fully open position wherein a relatively small portion of the flat plate extends from the fitting into the air stream of the trunk duct. While this improved the situation with regard to the above-discussed air diversion problem, the air striking the flat plate damper was found to create considerable turbulence both in the trunk duct and in the branch duct, and acted as a restriction in those air streams. In addition, the relatively expensive damper, its mounting arrangement, and the needed linkage proved to be far too costly for the minimal results achieved therefrom.

The Goettel U.S. Pat. Nos. 4,491,124 and 4,569,110 are related to cutting tap-in orifices and tapping into rectangular ducts, rather than tapping into cylindrical ducts of flexible material, as taught by this invention. The Goettel patents represent a manifest relationship to the sheet-metal technology of the prior art, which is in distinct contrast to insulated spiral-tube flexible forms in combination with sheet-metal devices, as more recently developed.

The Nash U.S. Pat. No. 4,294,476 is also related to metal ductwork connections. The Harris U.S. Pat. No. 4,249,758 teaches joining a tubular member to a flat component such as a rectangular junction box or a sheet-metal duct.

The Wachter U.S. Pat. No. 4,147,382 entitled "Connecting Piece for a Branch Duct to a Substantially Round Air Conditioning Duct," describes the joining of cylindrical trunk tubes to cylindrical branch tubes, but in a somewhat different manner than earlier taught. The Wachter patent employs an elongate base on a branch tube that was connected to a trunk tube with a rectangular-to-cylindrical geometry rather than right-angle tubular-intersection joints.

The Grim et al U.S. Pat. No. 3,726,545 and the Primich et al U.S. Pat. No. 3,290,066, each previously mentioned, likewise taught joining of a circular branch member to a plenum chamber in the form of a junction box or flat-walled duct. Primich et al, Goettel and others have taught the use of tabs bendable to form a flange effect, but in a different form and relationship of parts than employed in this invention, as will be seen hereinafter. All of these prior patents relate to junctures with flat surfaces.

The Rice et al U.S. Pat. No. 4,491,349 entitled "Y-Connection for Flexible Conduit," which issued Jan. 1, 1985, is designed for use with a thin wall metal main conduit which has a plurality of grooves or corrugations extending around its periphery, "to provide the conduit with a degree of flexibility." The patentees describe that they utilize an inner shoe of sheet metal provided with a centrally disposed hole, as well as a saddle, with the inner shoe being intended to be inserted in through a hole several inches in diameter that is cut into the metal conduit that Rice et al are concerned with. The inner shoe is brought into a desired alignment with the hole in the conduit, with the tabs disposed around the periphery of the hole in the inner shoe being bent so as to extend upwardly through the hole in the metal conduit, and then pressed back against the outer face of the metal conduit. At this point the saddle with its short section of branch conduit is mounted over the hole in the metal conduit, in a desired relationship with the inner shoe. As described by the patentees Rice et al, rivets, spot welds or other suitable means are utilized to secure the tabs to the saddle.

It is important to note that both the internally positioned shoe and the externally positioned saddle utilized by Rice et al are stated to be dimensioned to extend around approximately 160° of the periphery of the metal conduit. Quite clearly, the weight of such large and bulky components as suggested by Rice et al would not be suitable for use with highly flexible ducting, and Rice et al do not in any manner explain how their heavy devices could be attached in any suitable and appropriate manner to light-duty flexible ducting. Also, the use of the Rice et al technique requires the workman to have access to the end of the duct in order that the shoe can be inserted. As will be seen hereinafter, end access is not required for the installation of the novel duct fitting in accordance with this invention.

It is manifestly obvious that Rice et al are not dealing with attachment to the same type of highly flexible ducting as is involved in the present invention. As pointed out hereinabove, the wording set forth in the Rice et al patent describes that the patentees utilize a metal main conduit equipped with a plurality of grooves or corrugations that provide the conduit with "a degree of flexibility," but Rice et al make absolutely no mention of any use with the highly flexible ducting with which the present invention is principally intended for use. The flexible conduit with which Rice et al are concerned would be able to be bent only to a limited extent in order to be able to pass around an obstacle in the path of the ducting, and such conduit could not tolerate short radius turns, as could the highly flexible ducting being principally referred to in conjunction with the instant invention. Also, the flexible conduit utilized by Rice et al could not withstand without substantial damage, any partial collapse of the conduit sidewalls, amounting to a reduction in diameter. In distinct contrast, the highly flexible ducting with which the present invention is principally concerned could clearly be utilized in the situation in which the ducting is caused to pass through a narrow opening or passageway, for any reduction in the diameter would cause no intrinsic damage to the highly flexible ducting, for it would merely increase in diameter at a location 90° to the location where the diameter has been reduced.

Another important point of distinction is that some 25 feet of the flexible metal conduit utilized by Rice et al could not possibly be compressed into a box approximately 30 inches long, as can the highly flexible ducting with which the instant invention is involved.

It is therefore most important to realize that the absence of effective devices and methods for joining round branch tubes to highly flexible trunk tubes in a desirable perpendicular relationship represents a distinct deficiency of all of these prior art devices. Quite unfortunately, the prior art did not teach an effective, efficient, low-cost and non-hazardous right-angle, direct joining of round branch air-conditioning/heating ducts to round, highly flexible ducts utilized as air-conditioning/heating trunks, and such technique did not become available until the time of my earlier applications Ser. No. 07/754,061 and Ser. No. 07/962,241. The latter application has now become U.S. Pat. No. 5,314,212, and the teachings of that patent are hereby incorporated by reference into this case.

It is therefore an important goal of this invention to provide a new and highly improved single piece duct fitting and method for the creation and mounting thereof, which technique overcomes the problems and shortcomings of the prior art, and greatly improves the procedures for securing branch lines to trunk ducts made of highly flexible ducting.

SUMMARY OF THE INVENTION

A single piece duct fitting of generally cylindrical configuration in accordance with this invention is intended for attachment in a right-angle relationship to a relatively large cylindrically-shaped flexible duct having a curved, easily deformed sidewall in which a hole of a certain size has been created. My novel duct fitting is constructed of deformable sheet material that, before being assembled into a generally cylindrical configuration, was defined by an elongate sheet of material having first and second long edges. The first long edge is of a generally sinusoidal configuration, with a plurality of short, essentially evenly spaced lateral slots defining teeth disposed in an essentially evenly spaced relationship along this first long edge.

A pair of relatively closely spaced curves of generally sinusoidal configuration is disposed adjacent these teeth, which pair of curves bear a closely aligned relationship with the first long edge of generally sinusoidal configuration. A plurality of essentially evenly spaced slits extend between the pair of curves of sinusoidal configuration, with these slits defining a plurality of tab members of substantially identical length. These tabs are intended to bend outwardly at their approximate midpoints at the time lengthwise compression is applied to the duct fitting. The tabs, upon being bent flat by the application of lengthwise compression to the duct fitting, form a highly advantageous integral flange member of sinusoidal configuration extending around the exterior of the duct fitting.

The teeth disposed along the first long edge are insertable into the hole created in the curved sidewall of the flexible duct and then bent over into a position preventing withdrawal of the duct fitting from the flexible duct. Significantly, the integral flange member forming a primary feature of this invention serves as insertion-limiting means, when brought into contact with the exterior of the duct fitting, for effectively limiting the insertion of the duct fitting into the hole in the flexible ducting. Thus, it is to be seen that my novel single piece duct fitting can be directly used, without any preassembly being required.

As will be apparent to those skilled in this art, the commercially available cylindrically-shaped flexible duct is utilized in conjunction with sidewall protection means provided in accordance with this invention, insertable through such hole into the interior of the flexible duct. The insertion of the sidewall protection means is followed by the insertion into such hole of the aforementioned teeth, with the teeth then being bent over into conforming engagement with the sidewall protection means. The sidewall protection means at this point has assumed the configuration of the curved interior surface of the flexible duct, thus to secure the duct fitting to the flexible duct in a leak-free manner.

This invention may also be viewed as involving an elongate strip of sheet material having an integral flange of sinusoidal configuration extending around the periphery of the duct fitting, with the strip of sheet material having two long edges, with one long edge configured in the shape of a first sinusoidal curve having at least two peaks. Second and third sinusoidal curves created a substantially consistent distance apart extend adjacent the long edge, with the second curve residing at a consistently spaced distance from the first curve, and with the peaks of all three curves in substantial alignment.

A relatively large number of relatively short slits extend between the second and third sinusoidal curves in an essentially parallel, evenly spaced array, with the slits being of essentially consistent length and serving to define and create a number of bendable tabs of essentially consistent width. The strip of sheet material is bendable into a generally cylindrical component having a longitudinal centerline and is thereafter to be subjected to endwise pressure, applied substantially along the longitudinal centerline of the component, so as to cause the tabs to bend outwardly at approximately their midpoints. The tabs, upon being essentially flattened as a consequence of such longitudinally applied compressive force, form a highly advantageous flange member extending in a sinusoidal manner around the exterior of the duct fitting. This flange member is thus created without necessitating any preassembly step, and it admirably serves as an effective insertion-limiting means.

This invention may also be regarded as involving a method of creating a single piece duct fitting having an integral flange of sinusoidal configuration extending around the periphery of the duct fitting, with the first step taken in the pursuit of this method involving the step of selecting an elongate strip of sheet material having two long edges. A first sinusoidal curve is formed along one long edge of the sheet material, which curve has at least two peaks. A second and a third sinusoidal curve are established a substantially consistent distance apart, with the second curve residing at an essentially consistently spaced distance from the first curve, and with the peaks of all three curves in substantial alignment. A comparatively large number of relatively short slits are created that extend between the second and third sinusoidal curves in an essentially parallel, evenly spaced array, with the slits being of substantially consistent length and serving to define and create a number of bendable tabs of essentially consistent width.

In use, the strip of sheet material is bent into a generally cylindrical component having a longitudinal centerline and is then placed between first and second die members. Endwise pressure is then applied to the ends of the component by the utilization of the die members, substantially along the longitudinal centerline of the component, so as to cause the tabs to bend outwardly at approximately their midpoints. Such endwise pressure is continued until the tabs have become essentially flattened into a highly utilitarian flange member extending in a sinusoidal manner around the exterior of the duct fitting.

Each of the first and second die members has a component-receiving cavity as well as a sinusoidally-configured active edge, with the sinusoidal edge of one die member being able to be brought into a closely interfitted relationship with the sinusoidal edge of the other die member upon the die members being brought closely together. The strip of sheet material, when bent into the generally cylindrical component and placed in the component-receiving cavities of the first and second die members, is oriented such that its second and third sinusoidal curves are disposed in close alignment with the respective sinusoidal edges of the first and second dies. The sinusoidal edges of the dies thus form support for the tabs during the time the dies are being brought closely together during the formation of the flange member, and assure the formation of properly contoured flange components.

The flexible air duct material with which my novel duct fitting is used is variously known as flex duct, Thermaflex, and Dura-Flex. The Flexible Tubing Division of Automation Industries, Inc., the manufacturer of Thermaflex, describes its ducting as being constructed of a polymeric inner duct bonded permanently to a coated spring steel wire helix and supporting a thick fiberglass insulating blanket.

Excel Manufacturing Company of Wiggins, Miss., the manufacturer of Dura-Flex, markets flexible ducting in various diameters and utilizing various materials. One of the Excel products is described as reflecting temperature and resisting friction, whereas another product is described as a heavy duty insulated flexible duct with a tough polymer jacket designed for use in adverse temperature and humid conditions. Still another Excel product is touted as being an insulated flexible duct ideal for mobile homes and manufactured housing, having a thick, co-polymer jacket protecting the insulation from moisture.

Atco, a company with offices in Chicago, New York and San Francisco, manufactures their 70 Series flexible ducting as being suitable for supply and return air ducting in residential and commercial low-to-medium pressure heating and air conditioning systems. As to construction, Atco describes their flexible ducting as a double lamination of tough polyester which encapsulates a steel wire helix, thus to form an air-tight inner core serving to prevent the erosion of fiberglass into the airstream. The double layer core is enclosed in a thick blanket of fiberglass insulation and in preferred instances is sheathed in a rugged and durable metallized mylar jacket, with such jacket being described as tear and puncture resistant.

Quite obviously my novel single piece duct fitting having one end configured for attachment in a leak-free, essentially perpendicular relationship to the curved sidewall of a highly flexible, easily deformed insulating material is not limited for use with the product of any particular company. Rather, my novel duct fitting may be utilized with the highly flexible ducting manufactured by any of a number of different manufacturers, and the companies mentioned hereinabove are set forth only by way of illustrating the type of highly flexible product with which my novel duct fitting is to be used.

It is to be understood that when I refer to my duct fitting being ideal for use with highly flexible ducting, I am referring to products with relatively soft sidewalls, that may be easily deformed or bent so as to easily pass around obstacles disposed in the path of the ducting. An important characteristic of the type of highly flexible ducting with which my duct fitting is principally intended for use is ducting that is readily adapted for compression packaging for efficient shipping, warehousing and handling on the job, with one example of this being the capability of a standard 25 foot length of such ducting being compressible into a box approximately 30 inches long.

As to the particular configuration of my novel duct fitting, it may be described as having first and second open ends, with the first end having a curvature closely conforming to the configuration of the curved sidewall of the large duct with which it is to be used. The second end of the duct fitting may be of planar construction, being adapted to receive thereon, a relatively small branch duct that is to be connected in a leak-free manner to the large duct of highly flexible material.

It has already been made clear that the first end of my novel duct fitting has a plurality of short, lateral slots disposed at spaced locations around its circumference, thus to define a plurality of bendable teeth or fingers arranged in a non-planar array of suitable curvature. The teeth of the first end are intended to be inserted into a hole of suitable size cut into the curved, highly flexible sidewall of the large duct, with such teeth then to be bent over into conforming engagement with the curved interior surface of the large duct.

To prevent my novel duct fitting from extending too far into a large trunk duct of highly flexible material, I configure my duct fitting to have the previously described integral, sinusoidally-shaped ring or flange encircling the periphery of the duct fitting, adjacent the base of the teeth extending along the curved edge of the duct fitting. This integral flange has sufficient height to rest against the curved outer sidewall of the trunk duct, thus to limit insertion of the duct fitting in a highly effective manner, with the configuration of this flange closely matching the contour of the curved outer sidewall of the large, highly flexible duct.

To prevent the edges of the teeth from cutting or damaging the interior sidewall of the trunk duct of highly flexible material, I prefer to use a ring of flat material inserted into the interior of the trunk duct, and caused to conform to the interior contour of the large duct. This latter ring has sufficient diameter as to prevent the outer portions of the teeth of the duct fitting coming into contact with the interior of the flexible trunk duct, subsequent to the teeth being bent over into positions such that they do not interfere with air flow through the large duct.

As to the installation of my novel duct fitting in a hole in highly flexible ducting, the workman extends his arm into the duct fitting and by the suitable application of pressure, he accomplishes a degree of compacting of the sidewall of the flexible ducting between the novel integral flange and the inner ring, this compacting of course taking place in the immediate vicinity of the hole in the flexible ducting. After inserting the inner ring, the workman bends over the teeth of the duct fitting into firm contact with the inner ring, thus to hold the fitting in a tight, virtually leak-free relationship with the highly flexible ducting.

It is therefore obvious that the novel external, sinusoidally-shaped integral flange and the inner ring serve together as a form of structural support for the sidewalls of the flexible ducting. These closely fitted members also serve as a highly effective means for securing the components in a virtually leak-free relationship, as a consequence of the external, sinusoidally-shaped flange and the inner ring undertaking an appropriate curvature as they tightly grip the flexible ducting therebetween. Quite advantageously, the curvature of these inner and outer members closely approximates the natural curvature of the highly flexible duct.

It is therefore a principal object of my invention to provide an improved single piece, low cost duct fitting having an integral external flange of sinusoidal configuration, enabling this duct fitting to be connected to the sidewall of highly flexible ducting in a greatly simplified, virtually leak-free manner, without necessitating the use of any obstruction in the interior of the highly flexible ducting.

It is another object of my invention to provide a duct fitting fabricated from a single piece of sheet material, needing no preassembly step in order to create an integral, sinusoidally-shaped flange that will serve to limit insertion of the duct fitting into the sidewall of a large flexible duct, which flange forms a carefully fitted, leakfree joint with the large duct.

It is still another object of this invention to provide a duct fitting having an insertion-limiting flange created in a single manufacturing step on the exterior of the duct fitting, with this flange possessing a curvature closely conforming to the curved sidewall of highly flexible ducting, such that this duct fitting can be connected, with a minimum expenditure of labor, to a hole of suitable size in the highly flexible ducting, accomplished in a secure, essentially leak-free manner.

It is yet still another object of my invention to provide a highly effective duct fitting wherein a curved end of the fitting can include the use of a contoured plurality of teeth to be inserted into a hole cut in the sidewall of highly flexible ducting, with an integral external flange of sinusoidal configuration utilized on the exterior of the duct fitting, such that after this flange has been brought into contact with the sidewall of the flexible ducting at the location of the hole, and the teeth have been bent over into contact with an internal ring, a tight, essentially leak-free joinder of the duct fitting to the curved sidewall of the flexible ducting is created.

It is still a further object of this invention to provide a novel method whereby an elongate piece of sheet material can be formed into a duct fitting having an integral, insertion-limiting flange of sinusoidal configuration suitable for use with flexible ducting, with this duct fitting being created in a single forming step.

These and other objects, features and advantages will be more apparent from a study of the appended drawings and accompanying description.

BRIEF DESCRIPTION OF DRAWINGS 1 is a perspective view of my novel, single piece duct fitting intended for use with highly flexible trunk ducting, with this view showing the distinctly curved integral flange provided at one end of the fitting to limit insertion, with the curvature of the flange being intended to closely conform to the curved sidewall of the relatively larger diameter, highly flexible ducting.

DETAILED DESCRIPTION

Figure 1:
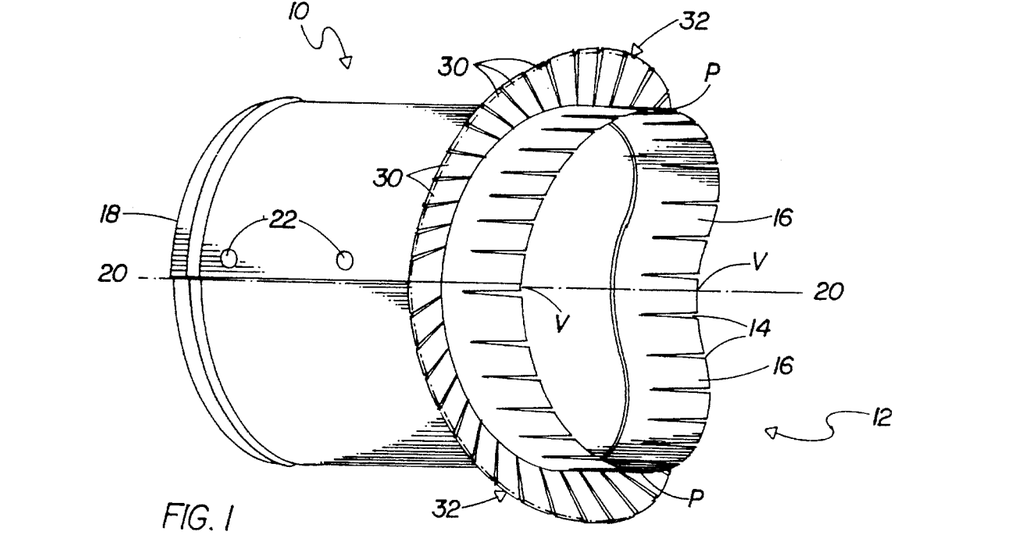

With initial reference to FIG. 1, it is to be seen that a single piece duct fitting 10 in accordance with this invention is of generally cylindrical configuration, with the end 12 of the fitting possessing a distinctively curved configuration. This curved end 12 of the fitting 10 is particularly contoured for a highly effective, leak-free attachment in an essentially perpendicular relationship to the curved sidewall of a relatively large cylindrically-shaped duct constructed of highly flexible, easily deformed insulating material.

Figure 3:
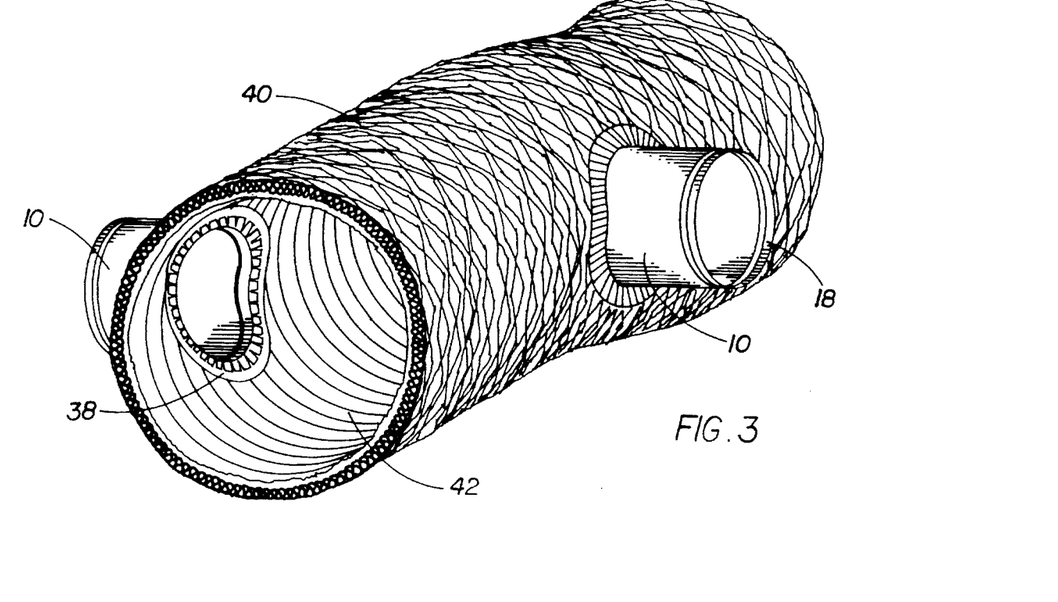
FIG. 3 is a perspective view showing a typical utilization of a pair of duct fittings fabricated in accordance with this invention and utilized in conjunction with a highly flexible trunk duct, with such duct fittings being installed in a relationship in which one fitting is deliberately not directly opposite the other fitting.
Figure 6:
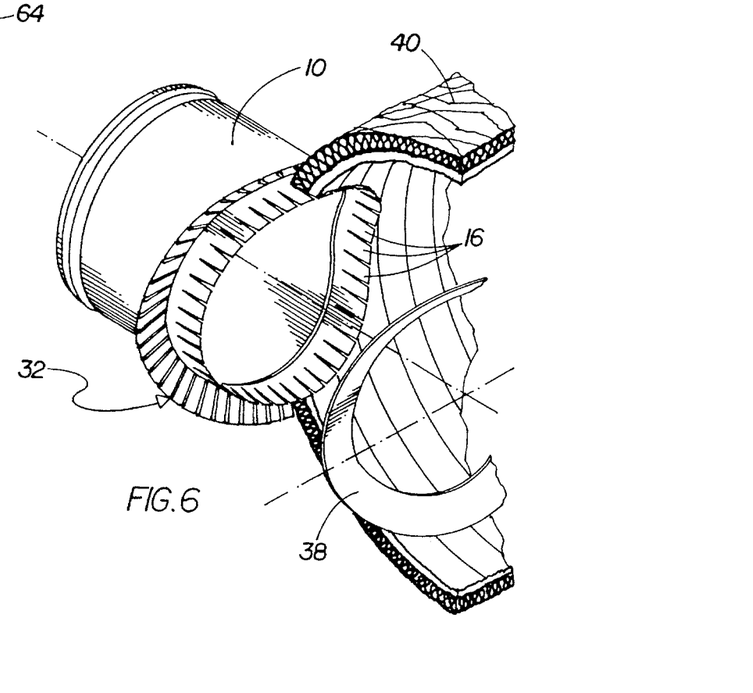
FIG. 6 is a view of the assembly step, wherein the teeth of the duct fitting have been inserted into the sidewall of the flexible duct, with the inner ring to be inserted upon the teeth, thereby to form a an internal member preventing damage to the interior surface of the large duct.

This highly flexible air duct material, which is depicted in FIGS. 3 and 6, is variously known as flex duct, Thermaflex, and Dura-Flex, which material offers flexibility of installation, such as when dealing with misalignment between components, or in ducting around obstacles. All of the flexible ducting I use is covered with a metallized mylar outer jacket, which offers substantial tear resistance.

Returning to a consideration of FIG. 1, a number of slots 14 are disposed in an essentially evenly spaced relationship around the curved end 12 of the fitting, thus defining a series of teeth or fingers 16 of essentially equal size. These teeth 16 are designed to be inserted into a hole formed in the sidewall of the highly flexible duct material (see FIG. 6), then to be bent over to prevent an undesirable withdrawal of the fitting from the relatively large, highly flexible duct.

In contrast with the shape of the curved end 12, the opposite end 18 of the duct fitting is conventional, in that it is an essentially flat end. In other words, the edges of the end 18 may be regarded as residing in a plane that is perpendicular to the longitudinal centerline 20 of the fitting.

As will be discussed hereinafter, my novel duct fitting is created from flexible sheet material, typically galvanized steel, with the ends overlapped to form a cylindrical component. The overlapped portions are then secured together such as by rivets 22, or by other techniques, including spot welding and the like.

As will be noted from FIG. 1, the outermost edges of the teeth 16 are not in a common plane, but rather form a distinctively curved contour that closely conforms to the curvature of the sidewall of a trunk duct 40 made of highly flexible ducting, with which it is to be connected in substantially a right angle. FIG. 1 reveals the utilization of the letter P at the uppermost and lowermost portions of the end 12, this letter representing what may be regarded as peaks. With reference to a clock face, the letter P has been applied at what might be regarded as the "12 o'clock" and the "6 o'clock" positions.

In contrast, the portions between the peaks are identified by the letter V, used to connote what may be regarded as valleys. Following this nomenclature, the valleys may be regarded as located at the "3 o'clock" and the "9 o'clock" positions. The upper and lower peaks P depicted in FIG. 1 may be regarded as extending substantially equal distances outwardly along the longitudinal centerline 20 of the duct fitting 10. Similarly, the pair of valleys V are disposed at corresponding locations with respect to the centerline 20.

Additional details of the connection of the end 12 of the duct fitting 10 to the curved sidewall of a trunk duct made of highly flexible material in a most advantageous, virtually leak-free manner will shortly be discussed in connection with FIGS. 3 and 6.

Figure 2:
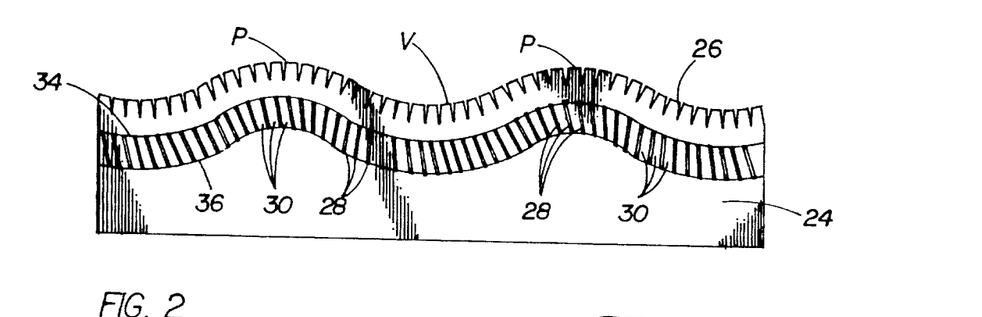
FIG. 2 is a plan view of the sheet material from which a single piece duct fitting in accordance with this invention is constructed, with this figure revealing one of the long edges of this sheet material cut in a generally sinusoidally-shaped configuration having teeth extending therealong, and with a pair of sinusoidal curves extending along the length of the sinusoidally-shaped long edge and containing therebetween a series of slits forming what are to become a plurality of bendable tab members.

It is to be understood that the highly desirable configuration of the curved end 12 is created by utilizing a piece of flexible sheet material 24 having the configuration depicted in FIG. 2. As will be described at greater length hereinafter, in order to form an integral flange duct fitting in accordance with this invention, the sheet material 24 is bent into a cylindrically-shaped component, and the ends of this component are then compressed to a suitable extent, so as to form the integral flange from tab components previously created in the sheet material 24. A more detailed explanation of the preferred procedure will be set forth hereinafter.

It will be noted from FIG. 2 that what may be regarded as the upper edge 26 of the sheet material 24 corresponds to the curved end 12 of the fitting 10. The upper edge 26 is basically of sinusoidal configuration, whereas the opposite long edge of the sheet material is essentially straight. The letter P has been applied to FIG. 2 in order to connote the location of the pair of peaks that are formed when such sheet material has been bent into a cylindrical configuration. Similarly, the letter V has been applied to locations on the sheet material where the valley is formed between the pair of peaks P when the sheet material has been bent into a cylindrical configuration and the overlapped portions secured together. Although I am not to be limited to this, I have found that the valley portions V that are formed between the pair of peaks P are on the order of being two inches closer to the long straight edge of the sheet material 24 depicted in FIG. 2, than are the peak portions P.

Returning to a consideration of FIG. 1, it is desirable to prevent the duct fitting 10 from extending too far into the hole cut in the sidewall of the highly flexible trunk duct 40, such as shown in FIG. 3. To this end I create a novel flange member 32 of sinusoidal configuration that is integral with the duct fitting 10, being disposed at a position encircling the periphery of the duct fitting 10 at a location adjacent the teeth 16 created in the curved end 12 of the fitting. Inasmuch as the flange member 32 is created, in accordance with the novel procedure described hereinafter, out of material integral with the sheet material 24, it is justifiable for me to call the duct fitting 10 a single piece duct connector having an integral flange. This novel arrangement is of course distinct from that described in my issued U.S. Pat. No. 5,314,212, wherein the flange is formed from a basically flat ring 30 of flexible material, that is secured in an appropriate position encircling the periphery of the duct fitting 10.

Returning to the instant invention, the flange member 32 is preferably located adjacent the apex of the slots 14 that are utilized to define the spaced series of teeth 16, with this spacing preferably being approximately ¼ inch. I am not to be limited to this, however.

As revealed in FIG. 2 of the instant invention, I show a closely spaced series of slits 28, formed in each instance to a consistent length, thus to form a series of strip members 30, hereinafter referred to as tab members, that together are to be used to form the flange member 32. This formation of the flange member from the constituent tab members is accomplished by the action of the die members 60 and 64, which action is discussed hereinafter in conjunction with FIGS. 4 and 5.

Regarding the placement of the slits 28 on the sheet material, the upper edges of the slits 28 may be regarded as being bounded by a curve 34 of sinusoidal configuration, and the lower edges may be regarded as being bounded by a curve 36, also of sinusoidal configuration. The curve 34 is disposed in a carefully spaced relationship to the sinusoidally-shaped upper edge 26 of the sheet material 24, with the spacing typically being approximately 1½ inches. For convenience, I may hereinafter refer to the curve 34 as the second sinusoidal curve, and the curve 36 as the third sinusoidal curve.

As will be noted from FIG. 2, the curves 34 and 36 are in close alignment with each other, meaning that the peaks of these curves are in essential alignment with each other, as well as being in alignment with the peaks P depicted at the top of FIG. 2. As a result of this arrangement, substantially all points along one of the curves 34 or 36 can be regarded as being at essentially a fixed distance away from corresponding points on the other curve. As a consequence, all of the slits 28 are created to be of substantially consistent length. I am obviously not to be limited to an exact spacing of the curves, but they may be approximately 1½ inches apart. Likewise, I am not to be limited to a particular spacing of the slits, but the slits may be spaced approximately ⅜ inches apart.

Although the slits 28 may each be in a parallel relationship with the longitudinal centerline 20—20 that is represented in FIG. 1, I prefer for the slits to repose at a slight angle to the centerline 20—20, as indicated in FIG. 2. I have found that angling the slits not only aids in the compressing and forming steps, but also, such angularity serves to prevent the existence of what might otherwise be gaps at certain locations around the circumference of flange 32.

Inasmuch as it is desired for the curved end 12 of the fitting 10 to closely conform to the sidewall of the highly flexible trunk duct 40, with the teeth 16 extending essentially equal distances (before bending) into the interior large, highly flexible trunk duct, it is obvious that the flange member 32 created from the tabs or strip members 30 should be caused to reside in essentially the same curved plane as the plane in which the outermost tips of the teeth 16 reside.

It is to be noted that the novel flange member 32 created in accordance with this invention is essentially continuous, and of a generally sinusoidal configuration, thus possessing a curvature closely conforming to the curved sidewall of the large duct 40 of highly flexible material.

With regard to a more detailed explanation of the manner in which I construct the novel duct fitting 10, the sheet material 24, in which the teeth 16 and the slits 28 have been formed, is first brought into a generally cylindrical configuration. It is made sure that the sheet material accurately forms a right circular cylinder rather than being of reduced diameter at one end. In forming the cylinder, one portion of the sheet material 24 overlaps the other.

Figure 4:
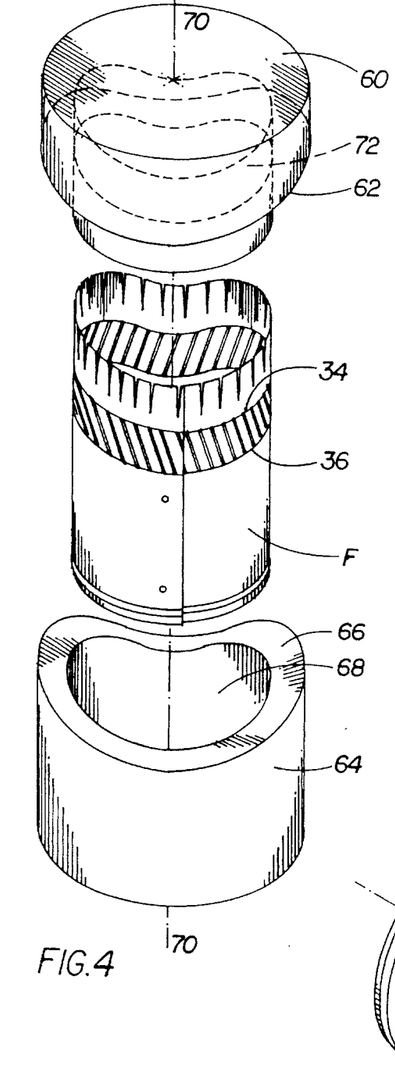
FIG. 4 is a view involving a pair of dies utilized in an opposed, cooperative relationship, with each die having a central cavity such that upon a selected elongate strip of sheet material being bent into a generally cylindrical component, such component can enter the cavities of these dies upon relative inward movement of the die members taking place, with endwise pressure applied to the component by the dies causing the tabs previously created on the sheet material to bend outwardly so as to create the integral, sinusoidally-shaped flange utilized for limiting insertion of the duct fitting into the large, flexible walled duct.

With reference now to FIG. 4, it will be seen that I have revealed an upper die member 60 and a lower die member 64, with these relatively movable die members being in alignment, residing along a centerline 70—70. The upper die member 60 has a sinusoidally-shaped lower edge 62, whereas the lower die member 64 has a sinusoidally-shaped upper edge 66. Importantly, the peaks of the sinusoidally-shaped lower edge 62 of upper die member 60 are oriented so as to coincide with the valleys of the sinusoidally-shaped upper edge 66 of the lower die member 64. Similarly, the peaks of the sinusoidally-shaped upper edge 66 of the lower die member 64 coincide with the valleys of the sinusoidally-shaped lower edge 62 of the upper die member 60, so that when the dies are moved together along the vertical centerline 70—70, the edges 62 and 66 will be brought into very close agreement. Although I have shown the relatively movable dies 60 and 64 disposed in a vertical relationship, this is not a firm requirement, and in some instances the dies could be relatively movable along a differently-placed centerline, such as a horizontally disposed centerline.

Continuing with FIG. 4, it is to be seen that I show the sheet material 24 of FIG. 2 having been bent into a component of approximately cylindrical configuration, preparatory to the component being inserted into the large cavity 68 located on the centerline of the lower die 64. I prefer to call this member a component F. The cavity 68 is only very slightly larger than the component F, and the depth of the cavity 68 is carefully established such as to permit the cylindrically configured component F of sheet material to extend inside only to a limited extent, namely, with the lower sinusoidal curve 36 extending around the component F coming to rest in substantial alignment with the sinusoidally-configured upper edge 66 of the lower die 64 at such time as the bottom of the component F reaches the bottom of the cavity 68. It is to be noted that the component F is carefully oriented in the lower die so that the peaks and valleys of the curve 36 substantially coincide with the peaks and valleys of the upper edge 66 of the lower die 64, as well as coinciding with the peaks and valleys of the lower edge 62 of the upper die 60.

At this point the upper die 60 and the lower die 64 are brought together, with the upper portion of the component F moving into the comparatively large cavity 72 located along the centerline of the upper die 60. The cavity 72, like the cavity 68, is only slightly larger than the component F. The cavity 72 is of limited depth, so that by the time the top edge of the component F comes into contact with the uppermost interior portion of this cavity, the upper sinusoidal curve 34 of the component F is in substantial coincidence with the sinusoidally-configured lower edge 62 of the upper die 60. As previously mentioned, I may refer to the upper sinusoidal curve 34 as the second sinusoidal curve.

Figure 5:
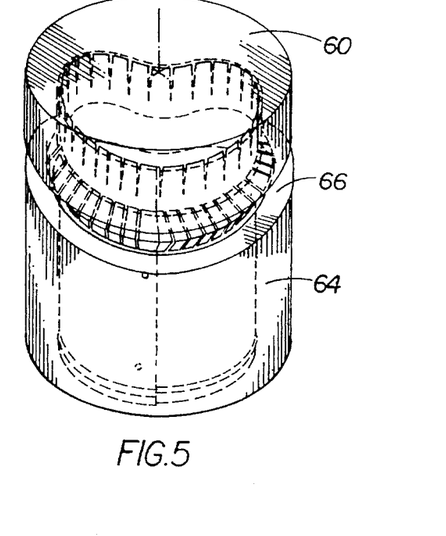
FIG. 5 is a view generally along the lines of FIG. 4, and showing how as a result of endwise movement of the die members, the bendable tabs have commenced outward movement, eventually culminating in the creation by such tabs of the sinusoidally-shaped flange.

At this point, the die members 60 and 64 are forced together so as to cause endwise pressure on the cylindrical component, and this causes the tabs or strip members 30 to commence outward movement, as revealed in FIG. 5. To assure outward movement, rather than inward movement, I preferably preform the tabs or strip members 30 so as to cause them to extend slightly outwardly. As a result of continued relative movement of the die members 60 and 64 along the centerline 70—70, the tabs or strip members 30 are ultimately compacted into the integral, outwardly extending tab members that form the sinusoidally-shaped flange member 32 integral with the sidewalls of the duct fitting 10.

When the slits 28 are approximately 1½ inches from top to bottom, the die stroke should also be approximately 1½ inches. As a result of this arrangement, the flange created from the compacted tab members is approximately ¾ inches wide. It is thus to be seen that the integral flange 32 is created during a single manufacturing step, with there being no need to undertake the further step of adding a separate insertion-limiting flange to the exterior of the duct fitting.

Referring back to FIG. 3, I there show a typical section of the highly flexible ducting 40, with which my novel duct fittings 10 are ideally suited for use. As previously mentioned, this highly flexible ducting may be regarded as constructed of a polymeric inner duct bonded permanently to a coated spring steel wire helix and supporting a thick fiberglass insulating blanket. Such an assembly is completed by an outer jacket of metallized mylar serving as an outer vapor barrier, which jacket resists tearing and external damage. Obviously, I am not limited to this exact construction, however.

As depicted in FIG. 3, the duct fittings 10 are typically connected to the relatively large, highly flexible ducting 40 in an offset relationship, or in other words, the one duct fitting 10 is disposed in a spaced-apart relationship to the other duct fitting 10. A basically flat inner ring 38 is employed in the interior of the highly flexible ducting 40, in order to prevent the teeth 16 located around the curved end 12 of the duct fitting 10 from cutting or in any way damaging the interior surface 42 of the highly flexible ducting 40. For this reason I choose to refer to the flat inner ring 38 as interior sidewall protection means, although it serves a very important additional function as well.

In FIG. 3, the flat inner ring 38 is shown in its operative position, whereas in FIG. 6 I reveal part of the installation procedure. In FIG. 6, I reveal the novel flange 32 about to be brought into contact with the periphery of the hole in the outer sidewall of the large duct 40, and it will be noted that the teeth 16 are extending outwardly, in a position such as to permit the inner ring 38 to be received thereon. After the ring has been inserted, the teeth 16 are then bent over so as to bring about a configuration closely conforming to the curved interior surface 42 of the highly flexible ducting 40. This also causes the ring 38 to assume a curved configuration essentially matching that of the novel flange member 32.

As a result of this arrangement, a carefully interfitted relationship of the duct fitting 10 with the large, flexible duct 40 is created, such that virtually no leakage will take place at the joint, and with any obstruction to the flow of air through the highly flexible ducting being minimized.

As to the particular details involved in the installation of my novel duct fitting in the hole in the highly flexible ducting 40, the workman extends his arm into the duct fitting and by a suitable application of pressure, he accomplishes a degree of compacting of the interior sidewall of the flexible ducting around the periphery of the hole, which of course is at a location between the novel flange member 32 and the inner ring 38. While holding the sidewall of the ducting in such compacted relationship, the workman bends over the teeth 16 of the duct fitting into the previously described firm contact with the second or inner ring 38, thus to hold the fitting in a tight, virtually leak-free relationship with the highly flexible ducting.

It is therefore obvious that the sinusoidally-shaped flange member 32 and the inner ring 38 serve as a form of structural support for the sidewalls of the flexible ducting, as well as a highly effective means for securing the components in a virtually leak-free relationship as a result of the rings undertaking a curvature closely conforming to that of the sidewall of the flexible ducting 40, as they tightly grip the flexible ducting therebetween.

It will be recalled from my issued U.S. Pat. No. 5,314,212 that in FIG. 6 of that patent I show a length of the large, highly flexible ducting utilized as a trunk duct 44, being connected in this instance to a typical plenum for an air handler. In conformity with good practice, several reducing connectors 46 are utilized at spaced locations along the duct 44, with these reducing connectors typically being of galvanized sheet metal. The ducting 44 may be supported from below by the rafters located above the ceiling of the rooms being supplied with cooled or heated air. This support arrangement causes the highly flexible ducting 44 to undertake an essentially cylindrically-shaped configuration. It is to be understood, however, that in many other instances, the highly flexible trunk duct 44 could reside in a curving or obstruction-avoiding configuration. Also, the trunk duct 44 could be utilized in a relationship in which it is supported below appropriate structural means by a series of straps, disposed at spaced locations along the duct.

Connected at a number of spaced locations along the trunk duct 44 a series of my novel duct fittings 10 may be used, with branch ducts 48 connected in each instance to the ordinary, planar ends 18 of the duct fittings 10. Suitable clamping rings are utilized to secure each branch duct to the respective duct fitting 10 as well as to the respective distribution outlet 50. As will be understood by those skilled in the art, suitable registers are utilized in the ceilings of the rooms below, attached either to the members 50 or directly to the ceiling.

As is obvious, my novel fittings are not limited to use with flexible ducting utilized only in ceilings, for my novel duct fittings may be utilized with ducting in other locations as well.

I am not to be limited to any particular material in the construction of duct fittings in accordance with this invention, but I have found 28 gage or 30 gage galvanized sheet metal to be quite appropriate in most circumstances. Quite obviously, I am not to be limited to the component dimensions set forth hereinabove, which were provided in conjunction with the dimensions found suitable for an exemplary embodiment of this invention. Inasmuch as this invention may be utilized with ducting of various sizes, the dimensions of the teeth, the spacing of the curves, the size of the tabs, and the like will in many instances be affected or controlled by the diameter of the ducting.

As should now be clear, my invention provides an improved duct fitting of relatively low cost, that can be fabricated from a single piece of sheet material, and which duct fitting thereafter requires no addition of a further component in order to complete the duct fitting. My novel duct fitting can be utilized with highly flexible ducting in a greatly simplified, virtually leak-free manner, without necessitating the use of any obstruction in the interior of the highly flexible ducting. Importantly, the installation of my novel duct fitting does not require access to the end of a trunk duct, for it can be installed by merely cutting a hole of the appropriate size at a desired location along the trunk duct.

It should now be abundantly clear that I have provided a considerably improved single piece duct fitting with a curved end closely conforming to the curvature of the sidewall of highly flexible ducting, which fitting is created as the result of a single manufacturing step, accomplished at minimum expense.

I claim:

1. A single piece duct fitting of generally cylindrical configuration for attachment in a right-angle relationship to a relatively large cylindrically-shaped flexible duct having a curved, easily deformed sidewall in which a hole of a certain size has been created, said duct fitting being constructed of deformable sheet material that, before being assembled into a generally cylindrical configuration, was defined by an elongate sheet of material having first and second long edges, said first long edge being of a generally sinusoidal configuration, with a plurality of short, essentially evenly spaced lateral slots defining teeth disposed along said first long edge, a pair of relatively closely spaced curves of generally sinusoidal configuration disposed adjacent said teeth, which pair of curves bear a closely aligned relationship with said first long edge of generally sinusoidal configuration, a plurality of essentially evenly spaced slits extending between said pair of curves of sinusoidal configuration, said slits being disposed approximately ⅜ inches apart and defining a plurality of tab members of substantially identical length which are intended to bend outwardly at their approximate midpoints at the time lengthwise compression is applied to said duct fitting, said tabs, upon being bent substantially flat by the application of lengthwise compression to said duct fitting, forming an integral flange member of sinusoidal configuration extending around the exterior of said duct fitting, said teeth disposed along said first long edge being insertable into the hole created in the curved sidewall of the flexible duct and then bent over into a position preventing withdrawal of said duct fitting from the flexible duct, said integral flange member serving as insertion-limiting means when brought into contact with the exterior of said duct fitting, for limiting the insertion of said duct fitting into the hole in the flexible ducting.

2. A single piece duct fitting of generally cylindrical configuration for attachment in a right-angle relationship to a relatively large cylindrically-shaped flexible duct having a curved, easily deformed sidewall in which a hole of a certain size has been created, said duct fitting being constructed of deformable sheet material that, before being assembled into a generally cylindrical configuration, was defined by an elongate sheet of material having first and second long edges, said first long edge being of a generally sinusoidal configuration, with a plurality of short, essentially evenly spaced lateral slots defining teeth disposed along said first long edge, a pair of relatively closely spaced curves of generally sinusoidal configuration disposed adjacent said teeth, which pair of curves bear a closely aligned relationship with said first long edge of generally sinusoidal configuration, a plurality of essentially evenly spaced slits extending between said pair of curves of sinusoidal configuration, said slits defining a plurality of tab members of substantially identical length which are intended to bend outwardly at their approximate midpoints at the time lengthwise compression is applied to said duct fitting, said tabs, upon being bent substantially flat by the application of lengthwise compression to said duct fitting, forming an integral flange member of sinusoidal configuration extending around the exterior of said duct fitting, said teeth disposed along said first long edge being insertable into the hole created in the curved sidewall of the flexible duct and then bent over into a position preventing withdrawal of said duct fitting from the flexible duct, said integral flange member serving as insertion-limiting means when brought into contact with the exterior of said duct fitting, for limiting the insertion of said duct fitting into the hole in the flexible ducting, said single piece duct fitting being utilized in conjunction with sidewall protection means insertable through such hole into the interior of the flexible duct, the insertion of said sidewall protection means being followed by the insertion into such hole of said teeth, said teeth then being bent over into conforming engagement with said sidewall protection means, which has assumed the configuration of the curved interior surface of the flexible duct, thus to secure said duct fitting to the flexible duct in a leak-free manner.

3. An elongate strip of sheet material usable in the construction of a single piece duct fitting having an integral flange of sinusoidal configuration extending around the periphery of the duct fitting, said strip of sheet material having two long edges, with one long edge configured in the shape of a first sinusoidal curve having at least two peaks, a second and a third sinusoidal curve created a substantially consistent distance of approximately 1½ inches apart, extending adjacent said one long edge, with said second curve residing at a consistently spaced distance from said first curve, and with the peaks of all three curves in substantial alignment, a relatively large number of relatively short slits extending between said second and third sinusoidal curves in an essentially parallel, evenly spaced array, with said slits being of essentially consistent length and serving to define and create a number of bendable tabs of essentially consistent width, said strip of sheet material being bendable into a generally cylindrical component having a longitudinal centerline and thereafter exposed to endwise pressure, applied substantially along the longitudinal centerline of the component, so as to cause said tabs to bend outwardly at approximately their midpoints, said tabs, upon being essentially flattened, forming a flange member extending in a sinusoidal manner around the exterior of said duct fitting.

4. An elongate strip of sheet material usable in the construction of a single piece duct fitting having an integral flange of sinusoidal configuration extending around the periphery of the duct fitting, said strip of sheet material having two long edges, with one long edge configured in the shape of a first sinusoidal curve having at least two peaks, a second and a third sinusoidal curve created a substantially consistent distance apart extending adjacent said one long edge, with said second curve residing at a consistently spaced distance from said first curve, and with the peaks of all three curves in substantial alignment, a relatively larger number of relatively short slits extending between said second and third sinusoidal curves in an essentially parallel, evenly spaced array, with said slits being of essentially consistent length and serving to define and create a number of bendable tabs of essentially consistent width, said strip of sheet material being bendable into a generally cylindrical component having a longitudinal centerline and thereafter exposed to endwise pressure, applied substantially along the longitudinal centerline of the component, so as to cause said tabs to bend outwardly at approximately their midpoints, said tabs, upon being essentially flattened, forming a flange member extending in a sinusoidal manner around the exterior of said duct fitting, said bendable tabs being preformed so as to extend somewhat outwardly, thus to assure the tabs bending outwardly at the time endwise pressure is applied to said duct fitting.

5. The elongate strip of sheet material usable in the construction of a single piece duct fitting having an integral flange of sinusoidal configuration extending around the periphery of the duct fitting as recited in claim 3 in which said relatively short slits extending between said second and third sinusoidal curves are aligned with the centerline of said duct fitting.

6. The elongate strip of sheet material usable in the construction of a single piece duct fitting having an integral flange of sinusoidal configuration extending around the periphery of the duct fitting as recited in claim 3 in which said relatively short slits extending between said second and third sinusoidal curves are disposed at an angle to the centerline of said duct fitting.

7. The method of creating a single piece duct fitting having an integral flange of sinusoidal configuration extending around the periphery of the duct fitting, comprising the steps of selecting an elongate strip of sheet material having two long edges, creating a first sinusoidal curve along one long edge of said sheet material, which curve has at least two peaks, creating a second and a third sinusoidal curve at a substantially consistent distance of approximately 1½ inches apart, with said second curve residing at a substantially consistently spaced distance from said first curve, and with the peaks of all three curves in substantial alignment, creating a large number of relatively short slits extending between said second and third sinusoidal curves in an essentially parallel, evenly spaced array, with said slits being of substantially consistent length and serving to define and create a number of bendable tabs of essentially consistent width, bending said strip of sheet material into a generally cylindrical component having a longitudinal centerline and placing such component between first and second die members, applying endwise pressure to the ends of said component by the utilization of said die members, substantially along the longitudinal centerline of the component, so as to cause said tabs to bend outwardly at approximately their midpoints, and continuing such endwise pressure until said tabs have become essentially flattened into a flange member extending in a sinusoidal manner around the exterior of said duct fitting.

8. The method of creating a single piece duct fitting having an integral flange of sinusoidal configuration as recited in claim 7 in which each of said first and second die members has a component-receiving cavity as well as a sinusoidally-configured active edge, with the sinusoidal edge of one die member being able to be brought into a closely interfitted relationship with the sinusoidal edge of the other die member upon said die members being brought closely together, said strip of sheet material, when bent into the generally cylindrical component and placed in the component-receiving cavities of said first and second die members, being oriented such that its second and third sinusoidal curves are disposed in close alignment with the respective sinusoidal edges of the first and second dies, said sinusoidal edges of said dies forming support for said tabs, during the dies being brought closely together in the formation of said flange member.

9. The single piece duct fitting of generally cylindrical configuration as recited in claim 1 in which said tab members are preformed so as to extend somewhat outwardly, thus to assure the tabs bending outwardly at the time endwise pressure is applied to said duct fitting.

10. The single piece duct fitting of generally cylindrical configuration as recited in claim 1 in which said slits extending between said pair of curves of sinusoidal configuration are aligned with the centerline of said duct fitting.

11. The single piece duct fitting of generally cylindrical configuration as recited in claim 1 in which in which said slits extending between said pair of curves of sinusoidal configuration are disposed at an angle to the centerline of said duct fitting.

* * * * *